Nov. 19, 1929.  A. L. STEVENS  1,736,023
OPEN HEARTH FURNACE CONSTRUCTION
Original Filed May 16, 1927
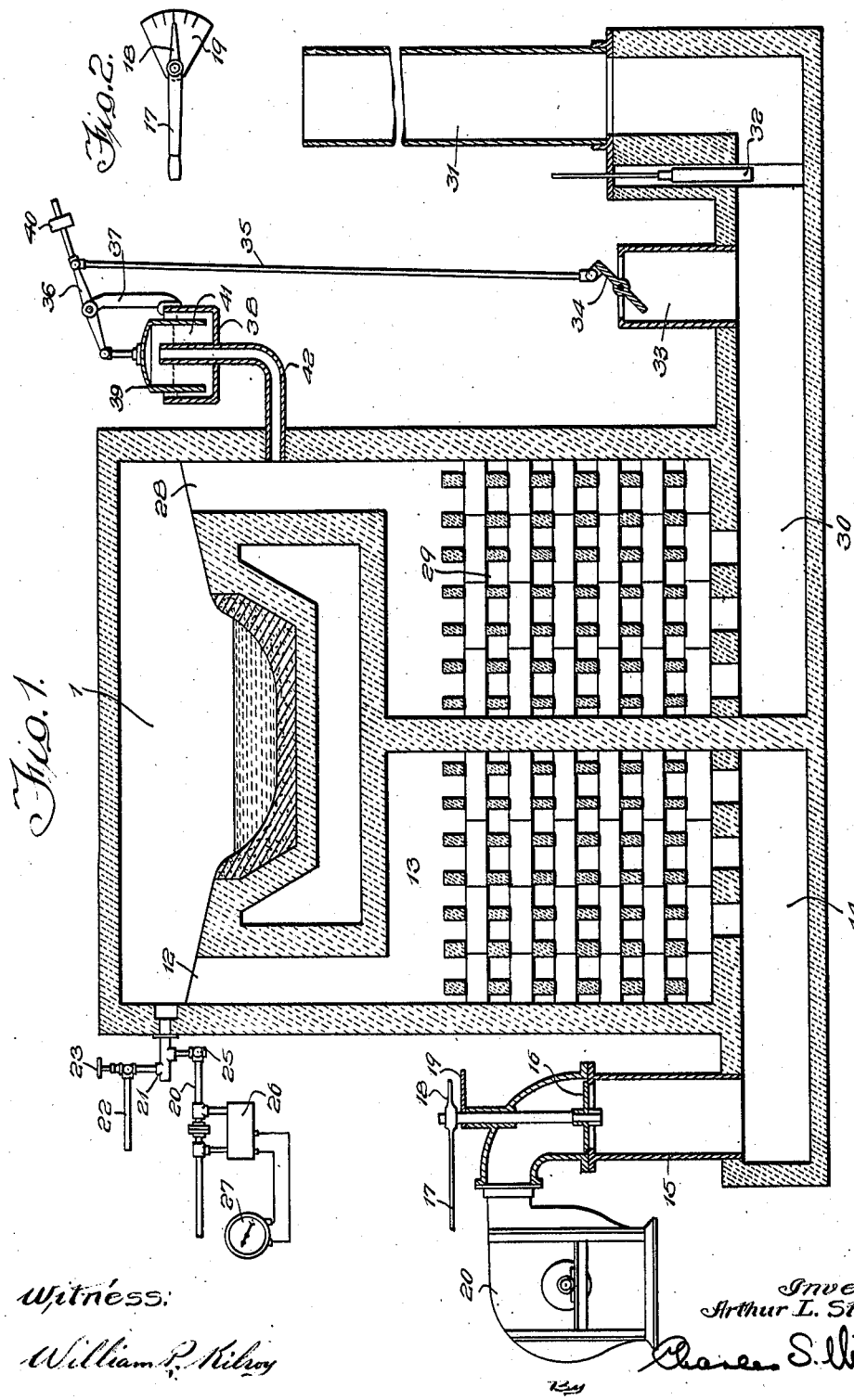
Witness:
William P. Kilroy
Inventor:
Arthur L. Stevens Patented Nov. 19, 1929

1,736,023

UNITED STATES PATENT OFFICE

ARTHUR L. STEVENS, OF EVANSTON, ILLINOIS, ASSIGNOR TO ARTHUR L. STEVENS CORPORATION, OF CHICAGO, ILLINOIS, A CORPORATION OF ILLINOIS

OPEN-HEARTH-FURNACE CONSTRUCTION

Original application filed May 16, 1927, Serial No. 191,563. Divided and this application filed September 14, 1928. Serial No. 305,896.

This invention relates to a new and improved furnace construction, and more specifically to a structure relating to furnaces of the open hearth or similar types.

Heretofore it has been customary in this type of furnace to supply air needed for combustion by natural draft. As in the usual type of furnace the regenerators for preheating the air are placed at a lower level than the hearth, it becomes necessary to maintain a draft pressure sufficiently below atmospheric pressure to induce the hot gas to flow downward from the melting chamber, and as air for combustion is induced by differential draft pressure it is usual to maintain a pressure in the melting chamber less than outside atmospheric pressure. The result of this practice is that a comparatively large volume of cold air is induced or infiltered through various openings such as doors, observation holes, burner openings, etc.

In melting steel the temperature of the waste gases is so high that the greater portion of the heat developed by combustion of fuel is represented by sensible heat of the waste gases and it is the purpose of the regenerators to recover as much of this heat as possible and return it by heating the air needed for combustion. The greater part of useful work done in an open hearth furnace is by means of heat so recovered. As the air needed for combustion is the only medium for heat transfer, it is therefore desirable that all of the needed air be passed through the regenerators and that all other air be excluded. This is not done in usual practice as heretofore prevalent, but is accomplished by my invention.

In common practice the amount of infiltered cold air becomes a large percentage of the air requirement and this acts directly to reduce the volume of air that can be used as a medium of heat recovery and transfer from the regenerators. Furthermore, the cold air must be heated to the temperature of the furnace, thus absorbing directly from the melting chamber heat that should be otherwise utilized. Loss from this source represents a reduction in the thermal efficiency and increases fuel consumption. Furthermore, it is common practice to operate such furnaces with an excess of air other than required for the combustion of fuel. As the usual method of regulation is a matter of judgment on the part of the operator, this excess air varies in quantity during the heat and in consecutive heats.

In melting steel it becomes necessary to oxidize certain elements to produce the analysis desired. A charge of pig iron will contain a higher percentage of carbon than is desired in the steel and this excess carbon and other substances are oxidized by either an oxygen bearing material such as iron ore or mill scale in the bath, or by oxygen in the atmosphere of the furnace.

Material that can be analyzed and weighed, can be charged into the furnace in the right proportion to produce the desired reactions, resulting in greater accuracy in operation than by depending upon a variable volume of oxygen contained in the furnace atmosphere.

By maintaining a pressure in the melting chamber substantially the same as the outside atmosphere, infiltration of cold air is prevented and the volume of air that can be passed through the regenerators is increased with a greater capacity for heat transfer.

To accomplish this, air is forced through the regenerators in a measured volume by supplying it at constant pressure and by regulation of the size of orifice in a suitable valve so that its volume is proportionate to the quantity of fuel being burned. The air supply thus becomes independent of and not related in any way to stack draft.

A stack is used merely to remove the waste gases and regulate the draft pressure to balance the difference in specific gravity between the heated gases leaving the furnace and the outside atmosphere. As in most furnaces, the regenerators are placed below the level of the melting chamber, it is necessary to maintain a pressure below atmosphere in the bottom flue equal to that equal to the height in feet to the hearth multiplied by the difference in weight of the heated gases and air at room temperature. When this draft pressure is properly regulated the pressure in the melting chamber may be maintained at the same pressure as the outside atmosphere or plus or minus, as may be desired. To insure this control of pressure a stack is provided having an excess capacity, and a damper is provided in the flue leading to it that may be partially closed to limit the draft pressure at the base of the regenerator to approximately that required. To automatically control any variation due to different rate of firing, etc., that may occur during the heating, an air opening is provided in the flue leading to the stack, said opening being fitted with a damper or valve which is opened or closed by means of a manometer connected to the furnace. Should the pressure fall at the furnace below what is desired indicating too strong a draft, the manometer opens the damper or valve, admitting air to stack which reduces the draft pressure. If the pressure increases at the furnace beyond what is desired, then the manometer closes the damper in air bypass and increases the draft pressure.

It is an object of the present invention to provide a new and improved open hearth furnace or the like which will accomplish a saving in fuel and pig iron, increase the yield of the furnace, and increase the quantity of slag and scrap used in a charge.

This invention is a division of application Serial No. 191,563, filed May 16, 1927, which on July 17, 1928, matured into United States Letters Patent No. 1,677,664.

With the above and other objects in view, as will be apparent, this invention consists in the construction, combination and arrangement of parts, all as hereinafter more fully described, claimed and illustrated in the accompanying drawings, wherein:

Fig. 1 is a sectional elevation of a furnace embodying the construction forming the subject matter of the present invention;

Fig. 2 is a fragmentary plan view showing the air control valve.

In the drawing the furnace hearth is shown at 1 and at the left end the air uptake 12 connected to the regenerator 13. The air passage 14 connects the regenerator 13 and the vertical passage 15. The passage 15 is controlled by a rotary valve 16 which is operated by handle 17. The handle 17 is provided with a pointer 18 cooperating with a calibrated scale 19. The blower 20 serves to force air under pressure through the valve 16.

The fuel burner 21 is shown entering the left end of the furnace and this burner has connected thereto the pipe 22, controlled by valve 23. This pipe is adapted for the introduction of steam or other fluid under pressure serving to atomize or vaporize the fuel. The fuel is introduced into the burner through pipe 24, controlled by valve 25. This pipe 24 has a bypass chamber 26 containing flow measuring apparatus operating a flow indicating meter 27.

The right end of the furnace is provided with an air uptake 28 which serves on the outgoing end of the furnace as a downtake for the products of combustion. This end of the furnace is also provided with a regenerator 29, communicating with the passage 30 which leads to the stack 31. The passage 30 is provided with a usual type of vertically sliding damper 32. The passage 33 enters the passage 30 between the furnace and the stack and this passage 33 communicates with the atmosphere.

The end of the passage is provided with the valve 34 which is connected by the operating link 35 to the lever 36. This lever 36 is pivoted at 37 to the manometer 38. The free end of the lever 36 is connected to the upper bell 39 of the manometer and the opposite end of the lever carries an adjustable counterbalance weight 40. The manometer is shown as filled with fluid at 41 and the chamber under the bell is connected to the downtake 28 by the passage 42.

While in the diagrammatic showing of the drawing the furnace has been shown as one adapted to continually run in one direction, this has been done for the sake of simplicity and clearness and it will be understood that both ends of the furnace are identical and that it is normally reversed periodically in operation. The regenerator on the outgoing end is connected to the stack and the regenerator on the incoming end is connected to the blower. This reversal is accomplished by means of valves and passages well known in the art and form in themselves no part of the present invention.

In the operation of the furnace, according to my invention, it will be understood that the regenerator 13 will have been heated by a previous furnace operation during which that regenerator received the heated outgoing gases. The valves controlling the flow of fuel and atomizing fluid are opened to give the desired fuel flow. This flow is recorded on the dial 27. The blower 20 is in operation and the valve handle 17 will be turned to the point at which an air flow will be permitted properly coordinated with the fuel flow indicated on dial 27. It will be understood that the valve scale 19 will be calibrated to correspond to the dial 27 so that the operator may know how to set the valve 16 for every rate of flow of the fuel. This air flow is so proportioned as to provide the oxygen necessary for complete combustion of the fuel and to provide a substantially neutral atmosphere in the furnace without the presence of oxygen.

The products of combustion pass from the furnace through downtake 28, regenerator 29 and passage 30 to the stack 31. It will be apparent that the stack 31 will exert a natural draft to draw the products of combustion out of the furnace. It is desired, however, to maintain the pressure in the furnace chamber substantially at that of the atmosphere. To accomplish this the manometer and valve 34 are provided. It will be apparent that if the valve 34 is widely open the stack will draw largely through passage 33 and will have little draft effect upon the furnace 11, due to the draft losses of the regenerator and the downtake. If the valve 34 is fully closed, the stack will directly affect the draft in the furnace alone. It is obvious, therefore, that by proper manipulation of the valve 34 any desired draft can be applied to the furnace up to the maximum draft created by the stack. The pressure in the downtake 28 is communicated to the bell 39 and when this pressure rises it will lift the bell. This elevation of the bell through the lever 36 and link 35 will tend to close the valve 34. Closure of the valve 34 creates additional stack draft in the downtake 28 and consequently lowers the pressure in that downtake. It will be apparent, therefore, that by the proper proportioning of weights and areas in the manometer and counterbalance 40 any desired draft may be maintained in the downtake 28. An additional manual control of the draft is accomplished by the sliding damper 32 which may be varied without varying the adjustment of the manometer and valve 34. With the pressure in the furnace chamber maintained at substantially that of the atmosphere, there will be no tendency for the air to be drawn in through the doors and peep-holes in the furnace. Preferably, however, all such openings are made with coverings as nearly gas tight as is practical in furnace construction and operation.

By the use of apparatus of the character shown and described according to the method of this invention, the heat losses, due to excess air and to cold air drawn into the furnace in ordinary methods of furnace operation, are reduced to a negligible amount. The air is forced in under positive pressure such as to overcome the pressure losses in the incoming regenerator and passages and the products of combustion are drawn out by suction sufficient to overcome the pressure losses in the outgoing passages and regenerator. It is, therefore, practical to operate the furnace with the furnace chamber itself substantially at atmospheric pressure.

The reduction in heat losses causes a very marked reduction in the quantity of fuel required per ton of steel produced and in actual practice this reduction has been found to approximate fifty per cent. A further important feature of the invention lies in the production of a superior grade of steel. The fact that the furnace atmosphere is substantially neutral permits the use of a low percentage of pig iron and a large percentage of scrap with consequent reduction in the cost of the charge. The oxidation desired in the operation can be carried out with great accuracy by charging into the furnace elements containing the exact amount of oxygen required for this oxidation. The use of such an oxidizing agent has the additional advantage that it sets up an active reaction with the evolution of gas that cleans the liquid metal of impurities.

When the conditions are met that give the greatest thermal efficiency in the furnace, a neutral atmosphere is automatically produced and to produce a neutral atmosphere, the furnace pressure is automatically made constant. The statement becomes clear when it is remembered that a neutral atmosphere depends upon the correct ratio of air to fuel and any variation in furnace pressure causes a variation in volume of air induced.

It is apparent from the foregoing that the apparatus described herein makes it possible to create a neutral atmosphere in the furnace chamber and to maintain said neutral atmosphere at atmospheric pressure.

What is claimed is:

1. In an open hearth furnace, the combination with a hearth chamber, of a source of fuel supply, a source of air supply, means for introducing fuel and air from said sources into the hearth chamber under constant pressure, means for measuring and maintaining the relative proportions of fuel and air so introduced, and a control, independent of said means for introducing the fuel and air into the hearth chamber, for maintaining approximately atmospheric pressure in the hearth chamber aforesaid.

2. In an open hearth furnace, a hearth chamber, regenerators, means for introducing fuel, means for introducing air under pressure to the regenerators, air uptakes leading from the regenerators to the hearth, means for measuring the fuel introduced into the furnace, calibrated means for controlling the quantity of air introduced into the furnace, a stack connected to the outgoing end of the furnace, and means for introducing additional air between the stack and furnace.

3. In an open hearth furnace, a hearth chamber, regenerators, means for introducing fuel, means for introducing air under pressure to the regenerators, air uptakes leading from the regenerators to the hearth, means for measuring the fuel introduced into the furnace, calibrated means for controlling the quantity of air introduced into the furnace, a stack connected to the outgoing end of the furnace, means for introducing additional air between the stack and furnace, and means for controlling the amount of additional air introduced.

4. In an open hearth furnace, means for introducing controlled quantities of air and fuel, a stack connected to the furnace, a passage for the introduction of additional air between the stack and furnace, a valve for said passage, and means controlled by the pressure in a portion of the furnace for operating said valve.

ARTHUR L. STEVENS.